(12) United States Patent
Fan et al.

(10) Patent No.: US 7,236,143 B2
(45) Date of Patent: Jun. 26, 2007

(54) SYSTEM, APPARATUS AND METHOD FOR CONFIGURING IDENTIFICATION OF A DISPLAY

(75) Inventors: Chang-Hsien Fan, Taoyuan (TW);
Fang-Tien Chen, Taoyuan (TW);
Chun-Tse Chien, Taoyuan (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 486 days.

(21) Appl. No.: 10/711,497

(22) Filed: Sep. 22, 2004

(65) Prior Publication Data

US 2005/0062884 A1 Mar. 24, 2005

(30) Foreign Application Priority Data

Sep. 22, 2003 (TW) ............... 92126047 A

(51) Int. Cl.
*G09G 5/00* (2006.01)
(52) U.S. Cl. ........................ 345/1.1; 345/1.3
(58) Field of Classification Search ............... 345/1.1, 345/1.2, 1.3, 3.1, 204; 701/200; 340/995.26; 348/14.07
See application file for complete search history.

(56) References Cited

U.S. PATENT DOCUMENTS

| | | | |
|---|---|---|---|
| 5,805,117 A * | 9/1998 | Mazurek et al. .............. 345/1.3 |
| 6,583,771 B1 * | 6/2003 | Furuhashi et al. ............ 345/1.1 |
| 6,868,332 B2 * | 3/2005 | Hashimoto .................. 701/200 |
| 2003/0071832 A1 * | 4/2003 | Branson ..................... 345/698 |
| 2003/0098820 A1 * | 5/2003 | Someya et al. .............. 345/1.3 |
| 2003/0227423 A1 * | 12/2003 | Arai et al. .................. 345/1.1 |
| 2006/0001595 A1 * | 1/2006 | Aoki .......................... 345/1.2 |
| 2006/0077116 A1 * | 4/2006 | Chen et al. .................. 345/1.1 |
| 2006/0077117 A1 * | 4/2006 | Okuley ....................... 345/1.1 |
| 2006/0256035 A1 * | 11/2006 | Kondo et al. ................ 345/1.1 |

* cited by examiner

*Primary Examiner*—Nitin I. Patel
(74) *Attorney, Agent, or Firm*—Jianq Chyun IP Office

(57) ABSTRACT

A system, an apparatus and a method for configuring a display ID are provided. The system comprises a setting unit, a plurality of displays and a plurality of switches. Wherein, the displays are electrically coupled to the setting unit, and the switches are configured in between the setting unit and its corresponding display. Each of the switches corresponds to one of the displays, and is turned on or turned off by its corresponding display. When the setting unit issues a setting ID instruction, all of the switches is turned on by its corresponding display. Thereafter, the setting unit issues a plurality of identification configuration instructions. By sequentially turning off each of the switches, the ID of the corresponding display can be configured by each of the ID configuration instructions.

17 Claims, 3 Drawing Sheets

SYSTEM, APPARATUS AND METHOD FOR CONFIGURING IDENTIFICATION OF A DISPLAY

CROSS-REFERENCE TO RELATED APPLICATION

This application claims the priority benefit of Taiwan application serial no. 92126047, filed Sep. 22, 2003.

BACKGROUND OF THE INVENTION

1. Field of the Invention

The present invention relates to a system, an apparatus and a method for configuring identification (ID) of a display, and more particularly, to a system, an apparatus, and a method for configuring identification for a plurality of displays forming a TV wall.

2. Description of Related Art

With the progressive advancement of new technologies, different types of advertisement are frequently renewed. Wherein, the display is a commonly used device in the related fields. By combining multiple displays to form a single large screen TV wall, an image originally displayed on a general display is divided into a couple of images, and each of these images is then displayed on each of the displays composing the TV wall, such that the TV wall looks like a large screen TV. Therefore, each display composing the TV wall must have a unique identification (abbreviated as ID hereinafter), thus the image can be transmitted in considering the image signal related to specific display, and the TV wall can show them into a large image after receiving all specific images. In order to conveniently extend or reduce the quantity of the displays based on the real requirement when building up the TV wall or other purposes, the ID code of the displays are configured as the same code or an empty code when they are being manufactured. However, because of this limitation, the method for configuring a display ID has become a signification topic in building up the TV wall.

In the conventional art, in order to configure different IDs for several displays, the computer is electrically coupled to one of the displays first, and after the configuration is completed, to unplug the cable connecting the computer and the display and to plug the cable connecting the computer and the connection port of another display, and repeatedly unplug and plug other displays. Thus, if the TV wall is composed of several displays, the process of plugging in and unplugging the cable is elaborate. Accordingly, this requires great efforts and is also time consuming.

In summary, the method for configuring different IDs to several displays has following disadvantages: (1) the conventional method requires repeatedly plugging in and unplugging of the connection cable connecting the computer and the displays, and which is no doubt a time consuming and laborious work.

SUMMARY OF THE INVENTION

Accordingly, the present invention is directed to a system, an apparatus and a method for configuring an ID of a display. According to an embodiment of the present invention, each ID of the displays composing the TV wall can be sequentially configured without repeatedly plugging in and unplugging the connection line or cable to the setting unit and the displays.

According to an embodiment of the present invention, the switch electrically coupled to each display is utilized to sequentially configure an ID to each displays for composing the TV wall.

According to an embodiment of the present invention, the system comprises a setting unit, a plurality of displays and a plurality of switches. The displays are electrically coupled to the setting unit, and the switches are configured in between the setting unit and its corresponding display, wherein each of the switches corresponds to one of the displays and can be turned on or turned off by its corresponding display. Initially, all of the switches are all turned on by its corresponding displays. Next, all microprocessors receive the setting ID instruction from the setting unit. Next, all displays change to ID setting mode and control all switches turn off. The first display receives first ID information from the setting unit. The first ID microprocessor stores the ID in a memory. The first microprocessor quits the ID setting mode and back to normal operation mode. Then, the first microprocessor issues a control signal to turn on the first switch. The first microprocessor replies a signal indicating the setting is completed to the setting unit.

According to the embodiment of the present invention described above, when the setting unit received the replied signal, a subsequent setting ID instruction is issued to next display.

According to the embodiment of the present invention described above, the setting unit comprises a CPU, a memory and a communication interface including a transmitting terminal and a receiving terminal, which are electrically coupled to a receiving terminal and a transmitting terminal of a microprocessor in each display via transmission lines Tx and second transmission lines Rx, respectively.

According to the embodiment of the present invention described above, for first display, a receiving terminal and a transmitting terminal are electrically coupled to the transmitting terminal and the receiving terminal of the communication interface of the setting unit via transmission lines Tx and transmission lines Rx, respectively. In addition, for second display, a receiving terminal of the communication interface is electrically coupled to the transmission terminal of the setting unit via a first switching unit corresponding to the first display.

According to the embodiment of the present invention described above, each display comprises a memory for storing its ID.

According to the embodiment of the present invention described above, a system for configuring a display ID is provided and a setting unit is adapted for performing the ID configuration function. Wherein, the displays are electrically coupled to the setting unit, and the switches are configured in between the setting unit and its corresponding display. Each of the switches corresponds to one of the displays respectively, which can be turned on or turned off by its corresponding display.

In the system mentioned above, when the setting unit issues the setting ID instructions, a subsequent setting ID instruction is issued according to a reply signal sent back by the configured display.

In the system mentioned above, each display is not electrically coupled to the setting unit until the ID configuration of the previous display is completed and the previous switch corresponding to the previous display had been turned off.

In the system mentioned above, each display comprises, for example, a memory for storing its ID.

In the system mentioned above, the switch is, for example, an electronic switch.

In the system mentioned above, the setting unit is, for example, a computer or a portable computer.

The present invention is also directed to a method of configuring a display ID. In this embodiment, a setting system is used to perform the display ID configuration function, wherein the setting system comprises a setting unit, a first display, a second display, a first switch and a second switch. In method of configuring a display ID, according to an embodiment of the present invention, initially, all of the switches are all turned on by its corresponding displays. Next, all microprocessors receive the setting ID instruction from the setting unit. Next, all displays change to ID setting mode and control all switches turn off. The first display receives first ID information from the setting unit. The first ID microprocessor stores the ID in a memory. The first microprocessor quits the ID setting mode and back to normal operation mode. Then, the first microprocessor issues a control signal to turn on the first switch. The first microprocessor replies a signal indicating the setting is completed to the setting unit.

The setting unit issues a second setting ID instruction to the second display. The second display receives second ID information from the setting unit. The second ID microprocessor stores the ID in a memory. The second microprocessor quits the ID setting mode and back to normal operation mode.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF EMBODIMENTS

The present invention provides a system and an apparatus for configuration a display ID, suitable for a TV wall composed of a plurality of displays. In the present invention, the unique ID of the display can be directly configured by using a setting unit, such as a computer, without repeatedly plugging in and unplugging the connection lines or cables connecting the setting unit and the connection port of each display. Likewise, all IDs of the displays composing the TV wall can be configured without repeatedly connecting and disconnecting the setting unit with the connection port of each display.

Figure 1:
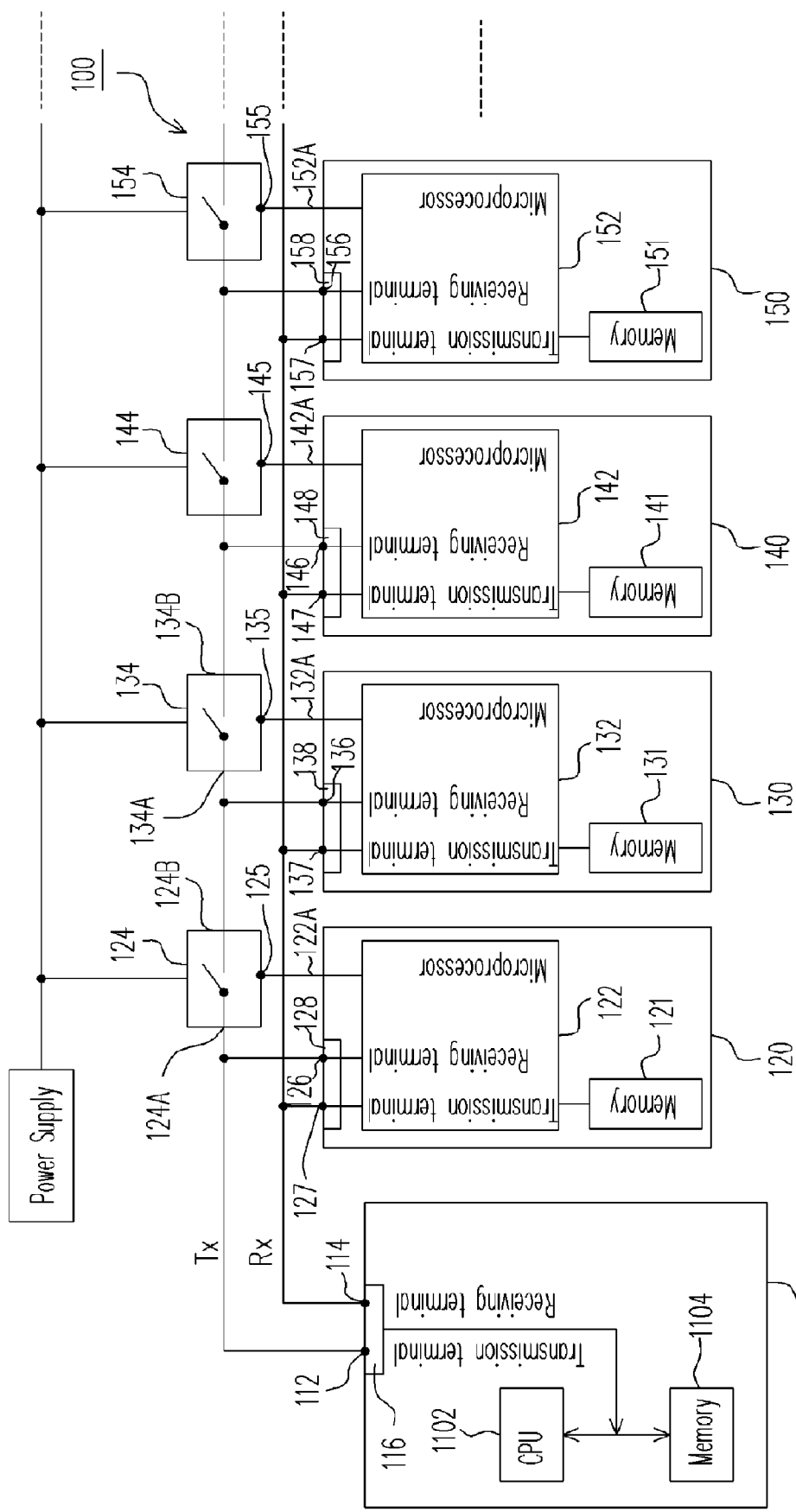
FIG. 1 schematically shows a circuit block diagram of a setting unit in the system for configuring a display ID according to an embodiment of the present invention.

Referring to FIG. 1, a circuit block diagram of a setting unit of the system for configuring a display ID according to an embodiment of the present invention is shown. In the present embodiment, the displays are configured by a setting unit 110 inside a system 100 for configuring display IDs. Wherein, the setting unit 110 comprises a CPU 1102, a memory 1104 and a communication interface 116, wherein the communication interface 116 includes a transmission terminal 112 and a receiving terminal 114 for transmitting and receiving information, respectively. ID information sent from the setting unit 110 is inputted into the displays through the communication interface 116. In the present embodiment, the communication interface 116 are a RS232 and the transmission terminal 112 and the receiving terminal 114 of the communication interface 116 are a RS232 transmission terminal and a RS232 receiving terminal, respectively. In addition, the setting unit 110 may be a PC (Personal Computer), a laptop computer, or any equipment having a processor capable of performing control and calculation functions well known to one of the ordinary skill in the art. However, it is not necessarily limited thereto. In this embodiment, the system for configuring the display ID 100 comprises a plurality of displays 120, 130, 140 and 150. Wherein, the quantity of the displays included in the system 100 depends on the physical design and requirements. A TV wall composed of four displays is exemplified hereinafter for describing the present invention. However, the scope of the present invention is not necessarily limited thereto.

In the present embodiment, two groups of transmission lines Tx and Rx are used in connecting the system for configuring the display ID 100. When building up the system (e.g. the TV wall), the first section of the transmission lines Tx are electrically coupled to a transmission terminal 112 of the setting unit 110, the receiving terminals 126 of display 120 and the input terminal 124A of the switch 124.

The second section of the transmission lines Tx are electrically coupled to the output terminal 124B of the switch 124, the receiving terminals 136 of display 130 and the input terminal 134A of the switch 134.

The third section of the transmission lines Tx are electrically coupled to the output terminal 134B of the switch 134, the receiving terminals 146 of display 140 and the input terminal 144A of the switch 144.

The fourth section of the transmission lines Tx are electrically coupled to the output terminal 144B of the switch 144, the receiving terminals 156 of display 150 and the input terminal 154A of the switch 154.

The transmission lines Rx are electrically coupled to a receiving terminal 114 of the setting unit 110 and the transmission terminals 127, 137, 147, and 157 of each display 120, 130, 140, and 150, respectively. With such electrical coupling between the transmission terminal and the receiving terminal, the instructions or information can be transmitted. A connection port complied with a common transmission protocol, such as a RS232 transmission line commonly used in the industry now, is employed by these two transmission lines Tx and Rx to communication between the transmission terminals and the receiving terminals of the setting unit 110 and displays. However, the transmission lines complied with other transmission protocol also can be applied in the present invention as considering the real requirements. As shown in FIG. 1, the transmission terminal and the receiving terminal of communication interface of the setting unit 110 are electrically coupled with the transmission terminal and the receiving terminal of the displays 120, 130, 140, and 150 via the RS232 communication interfaces 128, 138, 148, and 158, respectively.

In addition, Transmission lines Tx coupled the output terminal 134B of a switch 134 to the receiving terminal 146 and the input terminal 144A of a switch 144. Transmission lines Tx coupled the output terminal 144B of a switch 144 to the receiving terminal 156 and the input terminal 154A of a switch 154. In addition, a plurality of control lines 122A, 132A, 142A, and 152A are electrical coupling with the control terminals 125, 135, 145, and 155 of the microprocessors 122, 132, 142, and 152 respectively. The microprocessors 122, 132, 142, and 152 control the switch 124, 134, 144, 154 turning on or turning off. Herein, the switch for example is an electronic switch, and all switches are connected to a power supply for the power required for the switching operation.

For the sake of simplicity, in the ID configuration operation of the present embodiment, only the connection between the setting unit 110 and the displays 120 and 130 are described herein. The configuration method for other displays composing the TV wall 100, such as the displays 140 and 150, are the same as it, thus its detail explanation is omitted here.

Initially, all of the switches are all turned on by its corresponding displays. The setting unit 110 transmits a setting ID instruction through the transmission terminal 112 of the communication interface 116 and transmission lines TX to all display 120, 130, 140, 150.

In the present embodiment, the switch 124 comprises a input terminal 124A and a output terminal 124B and control terminal 125, wherein the input terminal 124A is electrically coupled to the transmission terminal 112 of the setting unit 110, and is selectively coupled to the output terminal 124B. The selective coupling/switching is controlled by the microprocessor 122 inside the display 120. In addition, the switch 134 comprises a input terminal 134A and a output terminal 134B, wherein the input terminal 134A of the switch 134 is electrically coupled to the output terminal 124B of the first switch 124, and is selectively coupled to the output terminal 134B. Similarly, the selective coupling/switching is controlled by the microprocessor 132 inside the display 130.

Figures 2A, 2B:
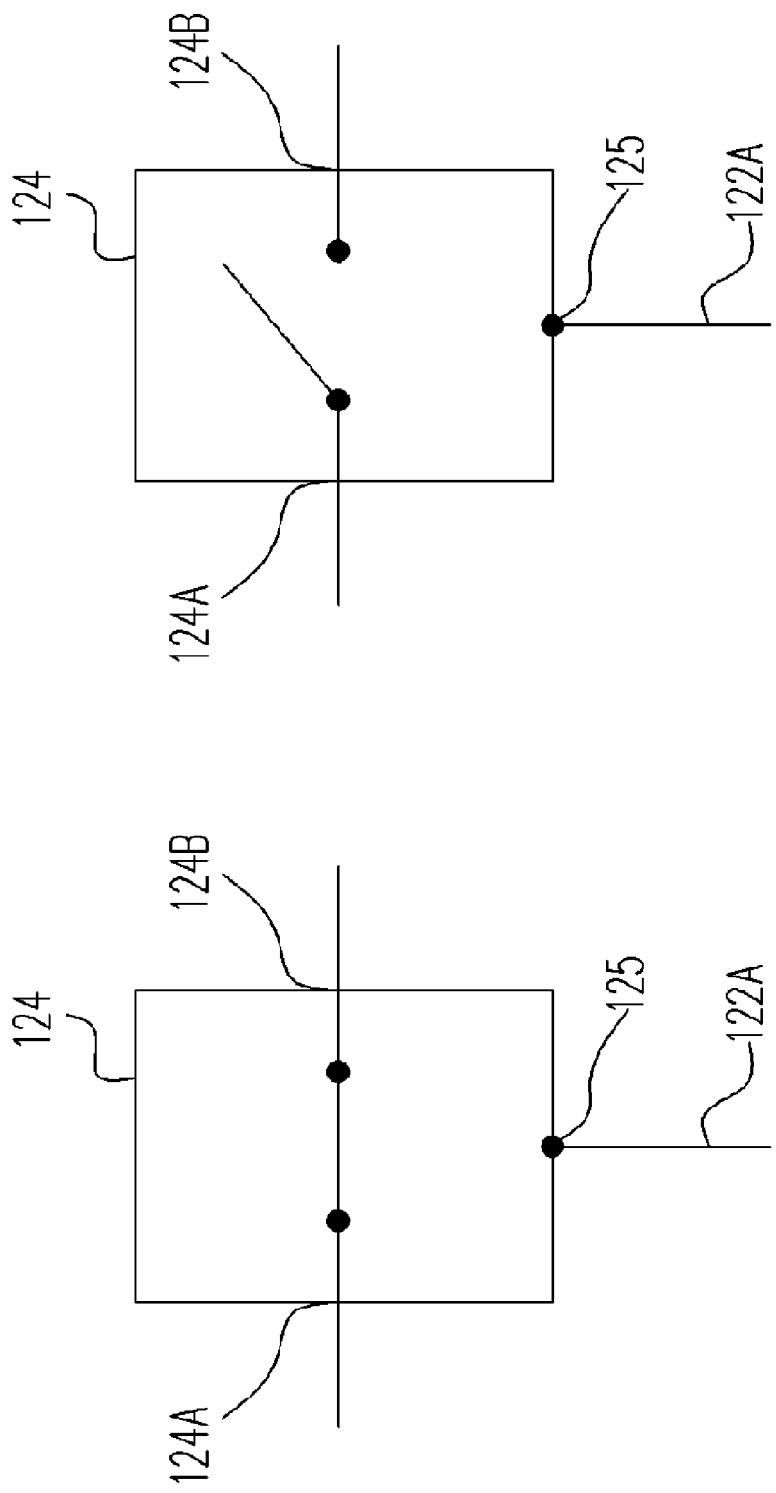
FIGS. 2A and 2B schematically show diagrams illustrating an operation mode of a first switch in the system for configuring a display ID according to an embodiment of the present invention.

Referring to both FIGS. 2A and 2B, schematic diagrams illustrating an operation mode of a first switch in the system for configuring a display ID according to an embodiment of the present invention is shown. In the present embodiment, regardless of the number of the switches, the operation is same as the switch 124. Therefore, only switch 124 is exemplified herein for explanation. In the present embodiment, the input terminal 124A of the switch 124 is electrically coupled to the output terminal 124B as shown in FIG. 2A, and the input terminal 134A of the switch 13 is electrically coupled to the output terminal 134B. In other words, the setting unit 110 can transmit information to all displays via the transmission lines Tx. Specifically, the CPU 1102(central processing unit) of setting unit 110 transmits the ID information, such as the setting ID instruction, through communication interface to all displays via the transmission lines Tx from the transmission terminal 112 of the communication interface 116. When each display is received the setting ID instructions, then all change to ID setting mode and control all switches turn off.

After it had been switched to the ID configuration mode, the input terminal 124A and the output terminal 124B are not electrically coupled with each other any more due to the open circuit of the switch 124 as shown in FIG. 2A, and the input terminal 134A and the output terminal are not electrically coupled, either. Meanwhile, since all switches are open circuit, that is the contact points inside the switches are not electrically contacted with each other, the display 120 can only receive the ID included in the ID information, and the ID is assigned to the display 120. In an embodiment of the present invention, the ID can be stored in a memory 121 inside the display 120, and the memory 121 can be a non-volatile memory, such that the ID can be permanently preserved.

In the present embodiment, the display 120 includes microprocessor 122, memory 121 and a communication interface 128 including a transmission terminal 127 and a receiving terminal 126. The transmission terminal 127 is electrically coupled to the receiving terminal 114 of communication interface 116 of the setting unit 110 via transmission lines Rx. The receiving terminal 126 is electrically coupled to the transmission terminal 112 of communication interface 116 of the setting unit 110. At first, when the microprocessor 122 receives the setting ID instruction sent by the setting unit 110 from the receiving terminal 126 and the transmission lines Tx, a control signal is transmitted to the control terminal 125 of the switch 124 via the control line 122A so as to turn on the switch 124.

The microprocessor 122 assigns this ID to the memory 121 of the display 120 according to the transmitted ID information. After the configuration is completed, a reply signal is issued from the microprocessor 122 through transmission terminal 127 and the operation mode is switched back to the normal operation mode. Meanwhile, a control signal is transmitted to the control terminal 125 of the switch 124 via the control line 122A to turn on the switch 124. In other words, the input terminal 124A and the output terminal 124B are electrically coupled with each other from its original non-connection status. And the first microprocessor 122 replies a signal indicating the setting is completed to the setting unit 110.

According to an embodiment of the present embodiment, the microprocessor 132 inside the display 130 also comprises a transmission terminal 137 and a receiving terminal 136. Wherein, the transmission terminal 137 is electrically coupled to the receiving terminal 114 of the setting unit 110 via the transmission lines Rx. The receiving terminal 136 is electrically coupled to the transmission terminal 112 of the setting unit 110 via the switch 124.

After the setting unit 110 receives the signal sent by the microprocessor 122. Next, setting unit 110 issues another ID information to display 130.

The microprocessor 132 receives the ID information for the display 130. More specifically, the microprocessor 132 assigns this ID for display 130 according to the received ID, for example, to save it in a memory 131 inside the display 130. After the configuration is completed, a reply signal is issued from the microprocessor 132 through the communication interface 138 and the transmission terminal 137 to the setting unit 110, such that the operation mode is switched back to the normal operation mode. Meanwhile, a control signal is transmitted to the control terminal 135 of the switch 134 via the control line 132A to turn on the switch 134 and in the meanwhile, the input terminal 134A and the output terminal 134B become electrically coupled with each other from their original non-connection status.

Thus, for the two displays (other display can be so implemented described above) can be sequentially configured using the setting unit 110 via the communication interface 116 as well as the transmission lines Tx and Rx. For example, the setting unit 110 configures the ID for the display 120 first, and then configures the ID for the display 130, and continues sequentially configuring the IDs for the displays 140, 150 and the remaining displays of the TV wall 100. According to an embodiment of the present invention, the IDs are respectively stored in the memories 121, 131, 141, 151 inside the displays. By using the switches, it is possible to prevent the display other than the intended display from receiving the instruction.

Figure 3:
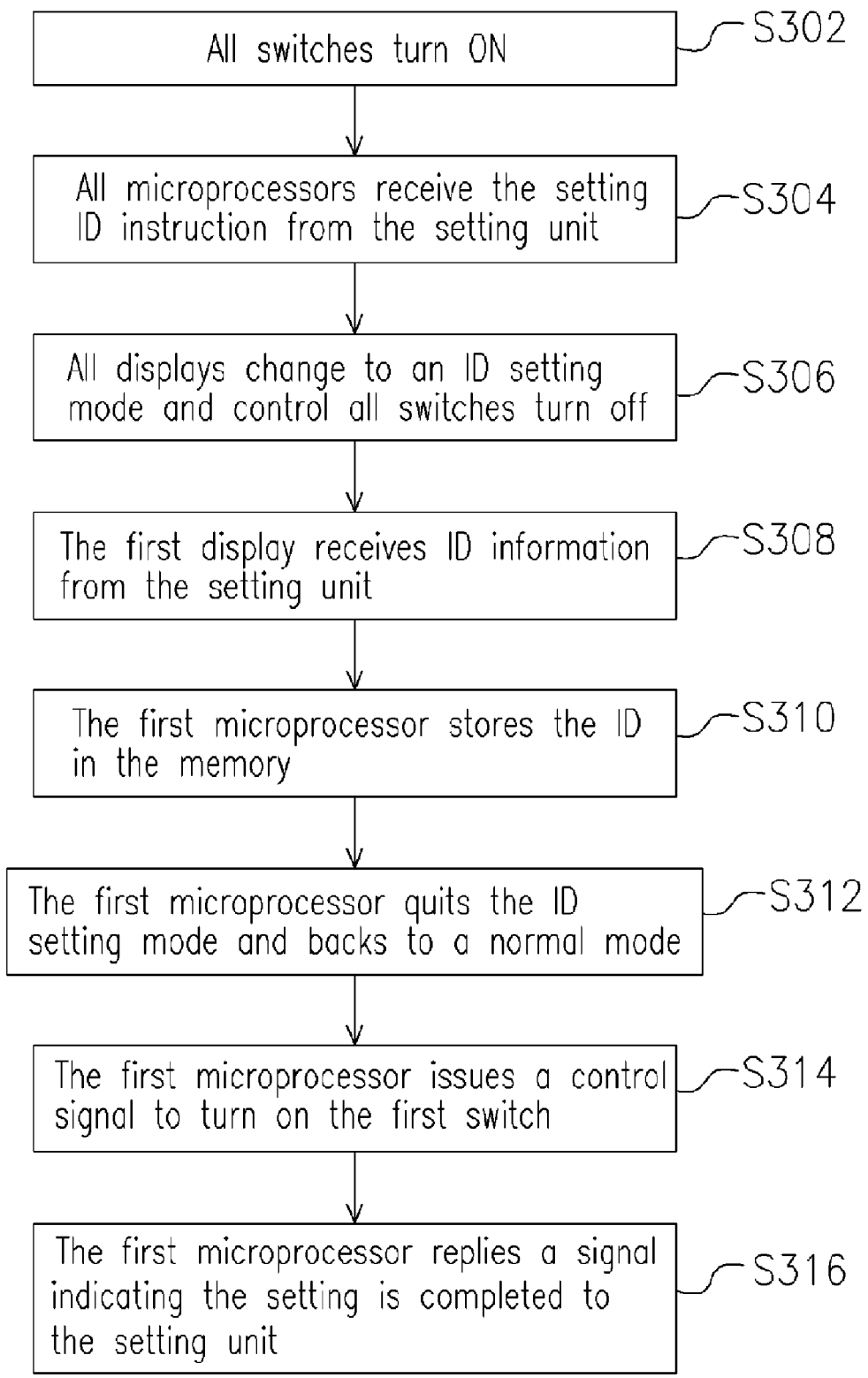
FIG. 3 schematically shows a flow chart illustrating a method of configuring a display ID according to an embodiment of the present invention.

Referring to FIG. 3, a flow chart illustrating a method of configuring an ID for display according to an embodiment of the present invention is shown.

According to an embodiment of the present embodiment, before configuring the displays, all switches are turned on (step s302). Next, all microprocessors receive the setting ID instruction from the setting unit (step s304). Next, all displays change to ID setting mode and control all switches turn off (step s306). The first display receives a first ID information from the setting unit (step s308). The first ID microprocessor stores the ID in a memory (step s310). The first microprocessor quits the ID setting mode and back to normal operation mode (step s312). Then, the first microprocessor issues a control signal to turn on the first switch (step s314). The first microprocessor replies a signal indicating the setting is completed to the setting unit (step s316).

After the setting unit had received the reply signal, the setting unit reissues the second ID information to the second display as shown in FIG. 1. Accordingly, the setting unit sequentially configures the IDs for all displays until all the displays have been configured with respective IDs.

In summary, the system, apparatus, and method configuring display ID provided by the present invention at least have following advantages.

(1) By applying the system, apparatus, and method of configuring the display ID according to the present invention, the time and labor consuming operation of repeatedly plugging in and unplugging of the connection cable connecting the setting unit and the connection port of each display via connection cable can be eliminated.

(2) The system, apparatus, and method of configuring the display ID according to the present invention allow the computer arbitrarily assign an ID to each of the displays and implement the update in a very efficient way.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. An apparatus for a setting unit to configure ID to at least two displays, comprising:
    at least a first switch and a second switch, the first switch comprising an input terminal, an output terminal and a control terminal, and the second switch comprising an input terminal and a control terminal, wherein the input terminal of the first switch is electrically coupled to a communication interface transmission terminal of the setting unit, and the output terminal of the first switch is electrically coupled to the input terminal of the second switch, wherein the control terminals of the first and second switches are adapted for receiving an control signal from the displays, and are turned on or turned off after said switch receives signal sent from the control terminal of the display;
    first transmission line, electrically coupled to the input terminal of the first switch, the receiving terminals of the display and a transmission terminal of the setting unit;
    second transmission lines, electrically coupled to the output terminal of the first switch and the input terminal of the second switch and receiving terminals of the display; and
    third transmission lines, electrically coupled to the transmission terminals of the displays and a communication interface receiving terminal of the setting unit.

2. The apparatus for configuring a display ID of claim 1, wherein the setting unit is a computer.

3. The apparatus for configuring a display ID of claim 1, wherein the communication interface receiving terminal and the transmission terminal of the display are a RS232 receiving terminal and a RS232 transmission terminal, respectively.

4. The apparatus for configuring a display ID of claim 1, wherein the communication interface of the setting unit are a RS232 receiving terminal and a RS232 transmission terminal, respectively.

5. A system for configuring a display ID, comprising:
    a setting unit, comprising a transmission terminal and a receiving terminal;
    at least two displays, each display comprising a control terminal, a microprocessor and a communication interface having a transmission terminal and a receiving terminal, wherein the microprocessor is electrically coupled to the transmission terminal, the receiving terminal, the control terminal, and a memory;
    at least two switches, for accepting a control signal from the displays, and being turned on or turned off by receiving the control signal;
    first transmission lines, electrically coupled to the input terminal of the first switch, the receiving terminals of the display and a transmission terminal of the setting unit;
    second transmission lines, electrically coupled to the output terminal of the first switch and the input terminal of the second switch and receiving terminals of the display; and
    third transmission lines, electrically coupled to the transmission terminals of the displays and a receiving terminal of the setting unit.

6. The system for configuring a display ID of claim 5, wherein the switches comprises at least a first switch and a second switch, wherein the first and second switches respectively comprises an input terminal, an output terminal and a control terminal, wherein the input terminal of the first switch is electrically coupled to a transmission terminal of the setting unit and the output terminal of the first switch is electrically coupled to the input terminal of the second switch, and wherein the control terminals are adapted to accept an control signal from the display to turn on or off the first and second switches upon receiving signal sent from the control terminals of the displays.

7. The system for configuring a display ID of claim 5, wherein the setting unit is a computer.

8. The system for configuring a display ID of claim 5, wherein the communication interface of each display are a RS232.

9. The system for configuring a display ID of claim 5, wherein the communication interface of the setting unit is a RS232.

10. A system for configuring a display ID, comprising:
    a setting unit;
    a plurality of displays, electrically coupled to the setting unit; and
    a plurality of switches, configured in between the setting unit and the displays, each of the switches corresponding to one of the displays, and being turned on or turned off by its corresponding display, wherein when the setting unit issues a setting ID instruction, each of the switches is turned on by its corresponding display, and then the setting unit issues a plurality of identification configuration instructions, and wherein by sequentially turning off each of the switches, the corresponding ID of the corresponding display is configured by each of the ID configuration instructions.

11. The system for configuring a display ID of claim 10, wherein when the setting unit issues the ID configuration instructions, a subsequent ID configuration instruction is issued based on a reply signal sent by each of the configured displays.

12. The system for configuring a display ID of claim 10, wherein each of the displays is not electrically coupled to the setting unit until the ID configuration of a previous display is completed and a switch corresponding to the previous display had been turned off, and the setting unit issues the ID configuration instruction corresponding to the subsequent display only after a reply signal for indicating the configuration has been completed is received by the setting unit, so as to configure the ID for the subsequent display.

13. The system for configuring a display ID of claim 10, wherein the setting unit comprises a transmission terminal and a receiving terminal, which are electrically coupled to a receiving terminal and a transmission terminal of a microprocessor inside each of the displays via a first transmission lines and a second transmission lines, respectively, and the switches are configured on the first transmission lines.

14. The system for configuring a display ID of claim 10, wherein among the displays, the receiving terminal and the transmission terminal of a first display are electrically coupled to the transmission terminal and the receiving terminal of the setting unit via a first transmission lines and a second transmission lines, respectively, and the receiving terminal of a second display is electrically coupled to the transmission terminal of the setting unit via the first switching unit corresponding to the first display.

15. The system for configuring a display ID of claim 10, wherein each of the displays comprises a memory for storing the ID.

16. A method for configuring a display ID using an apparatus, the apparatus comprising at least a setting unit, a first display, a second display, a first switch and a second switch, the first display is electrically coupled to the setting unit, and the second display is electrically coupled to the setting unit via the first switch, and the method comprising:
    turning on all switches;
    all microprocessors receiving setting ID instruction from the setting unit;
    all displays changing to ID setting mode and controlling all switches turn off;
    first display receiving first ID information from the setting unit;
    first ID microprocessor storing the ID in a memory of the first display;
    first microprocessor quitting the ID setting mode and backing to normal operation mode;
    second display receiving second ID information from the setting unit;
    second ID microprocessor storing the ID in a memory of the second display.

17. A method of claim 16, wherein after the first microprocessor quitting the ID setting mode and backing to normal operation mode, the first microprocessor issuing a signal to the setting unit.

* * * * *